United States Patent [19]

Lamy

[11] Patent Number: 5,446,918
[45] Date of Patent: Aug. 29, 1995

[54] CABLE NETWORK AND MODULATOR-DEMONDULATOR ARRANGEMENT FOR SUCH A NETWORK

[75] Inventor: Bernard Lamy, Palaiseau, France

[73] Assignee: U.S. Philips Corporation, New York, N.Y.

[21] Appl. No.: 160,319

[22] Filed: Nov. 29, 1993

Related U.S. Application Data

[63] Continuation of Ser. No. 772,895, Oct. 4, 1991, abandoned.

[30] Foreign Application Priority Data

Oct. 5, 1990 [FR] France .................. 90 12305

[51] Int. Cl.⁶ .......................... H04H 1/02; H04B 1/50
[52] U.S. Cl. ........................... 455/5.1; 455/86; 348/12
[58] Field of Search ............... 455/3.1, 3.3, 4.2, 5.1, 455/6.1, 6.2, 6.3, 67.1, 67.3, 84, 86; 370/71, 72, 73, 85.6, 85.7, 95.2, 121, 124; 348/12

[56] References Cited

U.S. PATENT DOCUMENTS

| | | | |
|---|---|---|---|
| 3,804,988 | 4/1974 | Browne | 370/71 |
| 4,210,779 | 7/1980 | Semokat | 370/72 |
| 4,450,477 | 5/1984 | Lovett | 358/86 |
| 4,494,138 | 1/1985 | Shimp | 358/86 |
| 4,564,940 | 1/1986 | Yahata | 370/124 |
| 4,677,686 | 6/1987 | Hustig et al. | 370/73 |
| 4,689,619 | 8/1987 | O'Brien, Jr. | 379/95.2 |
| 4,709,418 | 11/1987 | Fox et al. | 348/12 |
| 4,860,379 | 8/1989 | Schoeneberger | 348/12 |
| 4,910,791 | 3/1990 | Dickinson et al. | 358/86 |
| 5,038,140 | 8/1991 | Ikeuchi | 379/95.2 |
| 5,093,718 | 3/1992 | Hoarty et al. | 348/12 |
| 5,136,411 | 8/1992 | Park et al. | 358/86 |
| 5,142,690 | 8/1992 | McMillan, Jr. et al. | 379/95.2 |
| 5,155,590 | 10/1992 | Beyers, II et al. | 455/5.1 |
| 5,208,665 | 5/1993 | McCalley et al. | 348/12 |

FOREIGN PATENT DOCUMENTS

| | | | |
|---|---|---|---|
| 0010344 | 8/1979 | European Pat. Off. | H04L 1/20 |
| 0325331 | 1/1989 | European Pat. Off. | H04B 1/20 |

OTHER PUBLICATIONS

K. Prasad, "Design of 'Transnet' A Special Local Area Network", IEEE Proceedings of the 11th Conference on Local Computer Networks, Minneapolis, Minn., Oct. 6–8, 1986, pp. 46–55.

*Primary Examiner*—Reinhard Eisenzopf
*Assistant Examiner*—Thanh Le
*Attorney, Agent, or Firm*—Michael F. Marion

[57] ABSTRACT

An interactive cable network for sending information to, and receiving information from a plurality of subscribers. The information is sent from a head-end through a central distributor which includes a plurality of head-end modems each capable of transmitting information at respective transmit frequencies within a first range of frequencies, and receiving information at respective receive frequencies within a second range of frequencies. The respective transmit and receive frequencies for each head-end modem form a respective modem frequency pair. Each head-end modem is coupled to a group of user modems and each respective user modem of each group operates on the respective modem frequency pair of its respective head-end modem. The central distributor also interrogates each user modem within each group of user modems. Each head-end modem can detect the reception quality of the signals coming from its respective user modems and if the quality of said signals is insufficient can determine a new modem frequency pair to be used with its respective group of user modems.

9 Claims, 3 Drawing Sheets

CABLE NETWORK AND MODULATOR-DEMONDULATOR ARRANGEMENT FOR SUCH A NETWORK

This is a continuation of application Ser. No. 07/772,895, filed on Oct. 4, 1991, now abandoned.

BACKGROUND OF THE INVENTION

The present invention relates to an interactive and branched cable network adapted to be connected to a group of apparatuses capable of receiving and transmitting information, which apparatuses each comprise a modulator-demodulator arrangement, said group of apparatuses being connected to a central distributor provided with at least one head-end modulator-demodulator arrangement, the modulators-demodulators operating in a first frequency range in the case of transmission and in a second frequency range in the case of reception, each of said two frequency ranges being divided into a plurality of sub-ranges each using a different frequency.

Such a network is used, for example, for transmitting television or radio programs to users, enabling the transmission and treatment of "ascending" or upstream digital data coming from subscribers for the head of the network.

One of the key points of such a system is the development of specific bidirectional modulator-demodulator arrangements and the invention thus also relates to a modulator-demodulator arrangement for such an interactive and branched cable network.

A network of the type described in the opening paragraph is known from the article by K. Prasad: "Design of "Transnet" a special local area network", IEEE 11th conference on Local Computer Networks, 6th–8th Oct., 1986; IEEE New York US; pages 46–55. According to this document a branched network (cf FIG. 1 of this document) is used for different applications ("TV, data communications, voice systems" cf page 51 of this document). There is a frequency range for output channels ("outbound") and another frequency range for input channels ("inbound"), each information path taking up a specific sub-range (referred to as "channel" in the document). All information is transmitted via a common physical channel whose bandwidth is 30–400 MHz (cf FIG. 2b of the document), and must thus be selected at the level at which each information is used.

Because of the wide band of the common physical channel, the noise is considerable and the ascending information components are very difficult to demodulate correctly, particularly because the ascending or upstream paths are more polluted by the noise than the descending or downstream paths, for the network forms an antenna and a collector of all kinds of noise in this case.

SUMMARY OF THE INVENTION

According to the invention, to mitigate this drawback, each sub-range of the first range corresponds to a sub-range of the second range, while sub-groups of apparatuses are provided, in each of which sub-groups all the apparatuses use the same sub-range, and the central distributor is provided with a modulator-demodulator arrangement for each sub-range and with means for interrogating the apparatuses in turns in accordance with a circular polling process within one and the same sub-group of apparatuses.

Thus, each modulator-demodulator is a physical channel whose bandwidth and noise are reduced with respect to what would be necessary for the total width of all the channels. Since a plurality of apparatuses uses the same sub-range, the number of separate modulators-demodulators is not very high. The fact that the apparatuses are interrogated in turns in according with a polling process permits of treating each apparatus of a sub-range individually.

It would be necessary to have a different type of modulator-demodulator arrangement for each sub-range. Thus a large number of types of different modulator-demodulator arrangements would have to be manufactured and a diversified stock would have to be kept. It has thus been attempted to obtain a modulator-demodulator arrangement of a single type which can be adapted to the different possible sub-ranges. This provides the possibility of a dynamic allocation of frequencies: if in one frequency sub-range the ascending path is particularly polluted, it is possible to change to another sub-range.

To this end each head-end modulator-demodulator arrangement is provided with means for detecting the reception quality of the signals coming from the apparatuses, means for determining a new frequency to be used when this quality is insufficient and means for incorporating, in the signal transmitted to said apparatuses, information components indicating the new frequency to be used.

It is known to measure the error rate on the basis of error corrector codes used at the transmission (which permit of detecting the errors at the reception level). But this is only possible when such codes are used. The invention provides an estimation of the error rate for all digital signals.

According to the invention, the means for detecting the reception quality therefore comprise a time base supplying temporal windows having a width which is substantially equal to a quarter of a bit period and being centred at the hypothetical instants of transition in the eye pattern, a detector for detecting a transition of the signal outside these windows, a counter for counting the number of detections of such transitions, which counter supplies a signal indicating the insufficiency of quality for a predetermined number of detections.

Such means may be realized in a very simple manner: it is sufficient to connect them to the phase-locked loop used for restoring the rhythm or data clock rate at the head of the network.

Each head-end modulator-demodulator arrangement is advantageously provided with means for incorporating identifiable data in the signal transmitted to said apparatuses, which data are used to synchronize the frequencies of the modulator-demodulator arrangements of said apparatuses with respect to the frequencies of the head-end modulator-demodulator arrangement.

The realization of local oscillators in the user modulator-demodulator arrangements is thus more economical because they do not require a large intrinsic precision as they are synchronized by the head-end modulator-demodulator arrangement. Moreover, the circuit for restoring the rhythm at the level of the head-end modulator-demodulator arrangement can be simplified because, with the frequency being exactly known, only the phase of the ascending data is to be identified (it depends particularly on the length of the cable).

In a heterodyne receiver which comprises a local oscillator whose frequency is equal to the difference between the frequency of the received carrier and the intermediate frequency, it is known, inter alia, from the Japanese patent abstract 58-210728 to use the frequency of the local oscillator as the carrier frequency for the transmission in order to avoid the necessity of using two separate oscillators, which would be costly. However, in the present case it is desirable that the transmission and reception frequencies are situated in frequency bands which are relatively remote from each other: thus it is not possible to use this known structure and consequently a pilot oscillator would have to be provided for each transmission and reception frequency.

To avoid this drawback, it has been suggested to impose a particular relation between the transmission and reception frequencies, by which relation a single synthesized oscillator would suffice in a modulator-demodulator.

In a modulator-demodulator arrangement according to the invention operating in a first sub-range in the case of transmission and in a second sub-range in the case of reception and being connected to a transmitter-receiver comprising a heterodyne reception section using an intermediate frequency, the value of the transmission frequency is equal to the value of the reception frequency plus or minus a first integer multiplied by the value of said intermediate frequency, the whole being divided by a second integer.

When a modulator-demodulator arrangement transmits in the frequency range of 10–30 MHz and receives in the frequency range of 47–87 MHz while using the intermediate frequency of 10.7 MHz, said first integer is advantageously equal to one and said second integer is equal to three.

The frequencies can thus be introduced in the bands while allowing for the desired relation between the frequencies.

A modulator-demodulator arrangement according to the invention is characterized in that it also comprises a second oscillator whose frequency is controllable and a control circuit having an input for a signal whose frequency must be controlled and supplying a signal for controlling the frequency of the second oscillator as a function of the difference between the frequency of the signal applied to said input and a reference frequency, in that the signals of the two oscillators are applied to two inputs of a mixer whose mixed signal is applied to a frequency divider whose resultant signal is applied to the input of the control circuit and in that the signal of said second oscillator is applied to a frequency divider for supplying the signal at the transmission frequency of the modulator-demodulator arrangement at the output of said divider.

Thus, the same frequency reference can be used for generating the transmission frequency and for adapting to the reception frequency, i.e. for generating the intermediate frequency of the receiver.

A modulator-demodulator arrangement according to the invention is advantageously provided with means for aligning the frequency of the first local oscillator with the binary rate of the data from the head-end modulator-demodulator arrangement.

The average frequency error of the local oscillator is thus mathematically zero and it can be given its correct phase very rapidly while its temperature drift is eliminated.

A modulator-demodulator arrangement according to the invention which is interrogated by way of a selective call from a head-end modulator-demodulator arrangement, which involves the possibility of suppressing the carrier of the modems which "do not have the word" at a given instant, is advantageously provided with a circuit for controlling the amplitude of the transmission carrier, and this circuit is provided with means for supplying at least two predetermined nominal values for said amplitude, and with means ensuring that these values change from one to the other with a predetermined transition time.

The pollution of the ascending paths by switching transients due to successively switching the carrier on and off is avoided and any amplitude fluctuation due to the presence of filters is suppressed.

A modulator-demodulator arrangement according to the invention is advantageously provided with means for decoding information about the sub-range to be used in a signal received from a head-end modulator-demodulator arrangement, and with means for adjusting its transmission frequency as a function of this order.

The frequency can thereby be adapted at the level of the apparatuses dependent on the pollution of the ascending path, although the frequency is unknown at this level.

To simplify the construction, the modulation for the transmission in a modulator-demodulator arrangement can be applied directly to the second oscillator which generates the transmitted carrier. Then a problem presents itself: in order not to degrade the spectrum of transmitted data, the time constant of the phase-locked loop controlling this second oscillator must be very high, and since it must be possible to adjust the frequencies of the modulator-demodulator arrangements in a relatively large frequency range, a stable loop satisfying the restrictions imposed by the time constant cannot be realized. A known solution is to use a plurality of oscillators for covering all the sub-ranges: this is a cumbersome solution.

According to the invention, to solve this problem the second oscillator is provided with a frequency control circuit which comprises a low-pass filter having an adjustable time constant. This low-pass filter may advantageously be constituted by a switch followed by a capacitance, the switch being controlled by a pulse having a constant duration and being triggered by the signal from an auxiliary oscillator.

The possibility of varying the time constant is very useful for an easier synchronization of the loop.

The statistic dispersion of the values of the diodes referred to as "varicap" which are used in known manner for varying the frequency of the oscillator presents another problem: the modulation factor may vary.

To mitigate this drawback, a modulator-demodulator arrangement according to the invention is characterized in that it comprises a frequency demodulator for demodulating the correct intermediate frequency.

The modulation factor is thereby known and consequently it can be controlled and maintained constant.

Said demodulator may advantageously have two branches whose output signals are multiplied, a first branch comprising a bandpass filter centred at the nominal central value of the intermediate frequency and the second branch comprising a phase-shifting network adapted to introduce a phase shift which is equal to that produced by the filter in the first branch.

Such a demodulator has a moderate linearity but this is not important for the envisaged use. On the other hand, its use is economical and sensible and it has a high conversion rate and a good temperature stability.

BRIEF DESCRIPTION OF THE FIGURES

These and other aspects of the invention will now be described in greater detail with reference to the accompanying drawings.

DETAILED DESCRIPTION OF THE PREFERRED EMBODIMENTS OF THE INVENTION

Figure 1:
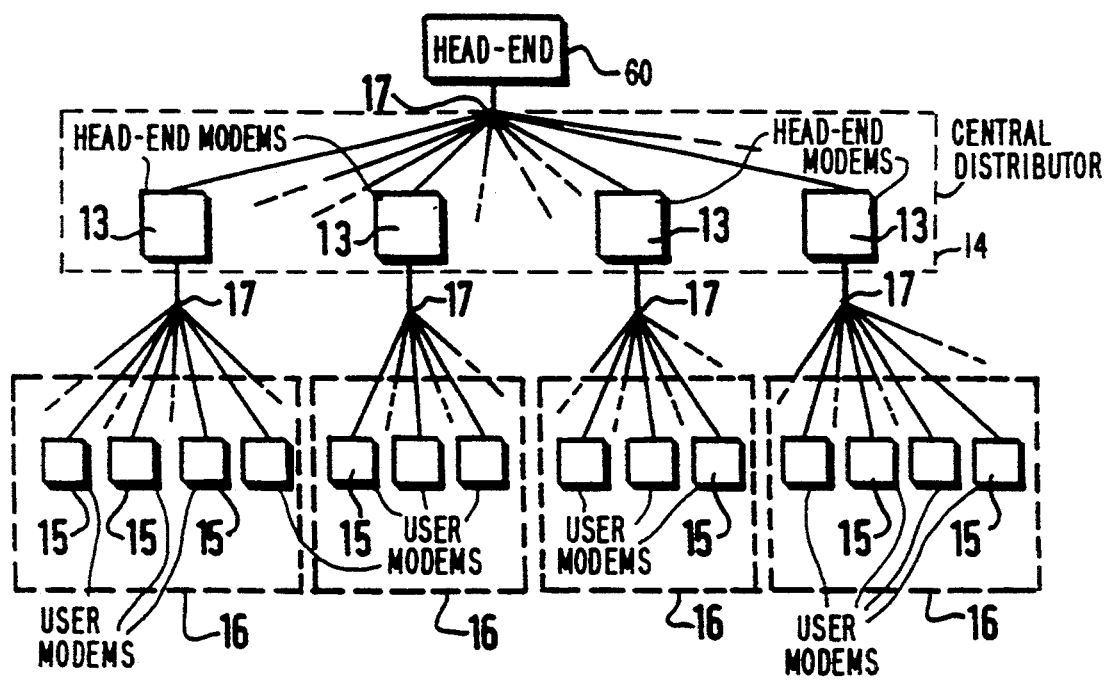
FIG. 1 shows diagrammatically a cable network.

The cable network of FIG. 1 is used for transmitting information (for example television or radio programs) from a central distributor 14 coupled between a head-end 60 to a given number of user subscriber apparatuses 15. The network is branched, i.e. it has successive "switching points" 17 between the head-end 60 and the users. The central distributor 14 comprises a plurality of modulator-demodulator arrangements 13, referred to as head-end modems, each connected to a group 16 of user apparatuses. Each user apparatus is capable of receiving but also transmitting information and to this end it comprises a modulator-demodulator arrangement 15, referred to as user modem.

This system is interactive, i.e. it permits the transport and treatment of "ascending" digital data coming from subscribers for the head-end 60. These data use the frequency range of 10–30 MHz in the example shown. The system also permits of transmitting the data in a "descending" sense: to this end it uses the frequency range of 47–87 MHz in the present example.

It should be noted that the network described here relates to the dialogue between users and distributor and the relevant television transmissions are sent through conventional channels outside the frequency bands mentioned in this description.

It is supposed that the maximum capacity of the number of users to be served is one hundred thousand. With a multiplex treatment using a unique carrier it would be necessary to have a passband of several megahertz. In this case the total number of users is divided into groups of, for example approximately one thousand users. Each of the two above-mentioned frequency ranges is divided into a plurality of sub-ranges each having different frequencies and each sub-range of the first range corresponds to a sub-range of the second range. Each group of users uses a sub-range at a different frequency carrier (it communicates with a separate head-end modem 13) and all the used modems 15 of the same group use the same sub-range. In the present example there is thus a total number of about one hundred carders (in each direction) in a network having a maximum occupied dimension of 100%. The total occupation of the spectrum is the same as with a unique frequency but the noise in each ascending path is much weaker.

In the present example it has been chosen to use the frequency range of 12.9 ... 19.5 MHz in one hundred channels of 66 kHz each. The important number of channels and thus the limited number of available frequency ranges as well as the chosen digital rate (19.2 kHz) impose the use of a modulation which has a limited magnitude but is strong enough with respect to the various forms of noise and pollution present in the ascending path. An FSK modulation of the MDF-2 type having a low factor (factor 0.8) may be chosen. To preserve a maximum spectral efficiency, an NRZ code is used. In the case where a channel of the ascending path nevertheless appears to be too much polluted, this situation is detected at the head-end 60 and a code is sent on the descending path to indicate a new channel each user modem 15 of the respective group (since the descending channel has a good signal-to-noise ratio, this indication can reach the user modem without any problem), which channel is either not used yet or, in the case of a fully occupied network, a channel for which a temporary overload will be admitted. Each user modem is of course also provided with means (known and not shown) for decoding the information in the received signal about the sub-range to be used, and means (also known and not shown) for adjusting its transmission frequency as a function of this order. At the start of a connection the user modem always uses the same frequency whose value is stored in a permanent memory and it is after the start of a change that the head-end modem 13 of the respective group may possibly indicate another frequency.

This process is advantageously generalized for all the groups of present users, i.e. there is a dynamic allocation of carrier frequencies at the head-end 60, in real time, in order to reduce the average error rate.

Figure 2:
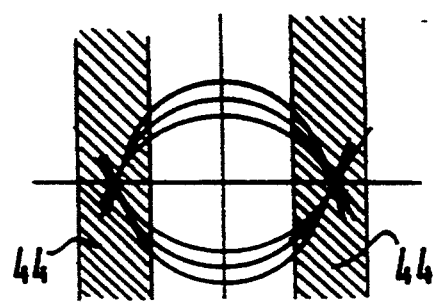
FIG. 2 shows an eye pattern to illustrate the operation of an arrangement for detecting the reception quality.

As the signals are digital, the means for detecting the reception quality of the signals coming from the user apparatuses comprise a time base supplying temporal windows 44 (FIG. 2) having a width which is substantially equal to a quarter of a bit period and being centred at the hypothetical instants of transition in the eye pattern. These windows permit of using the temporal variations of the transitions which are due to noise and to the different frequency fluctuations introduced in the channel. A detector detects the transitions of the signal situated outside these windows which are thus considered as a false bit. A counter is then triggered for counting the number of detections of false bits and if more than, for example, sixteen erroneous transitions have been found in a predetermined period (corresponding to a fixed error rate), the counter supplies a signal indicating insufficiency of quality. This signal is reset to zero when, for example 64 correct and consecutive bits have been received.

The reception parts of the user apparatuses use an intermediate frequency in the conventional manner (a reception referred to as "heterodyne"). The transmission and reception frequencies of the modems have the relation:

$$FE = (FR - FI)/3$$

in which FE is the value of the transmission frequency, FR is the value of the reception frequency, and FI is the value of the intermediate frequency.

The value FE of the transmission frequency is thus equal to the value FR of the reception frequency plus or minus a first integer multiplied (here "minus one") by the value FI of the intermediate frequency, the whole being divided by a second integer (here "three").

For each head-end modem 13 them is of course the reciprocal relation:

$$FE = 3 FR + FI$$

Figure 3:
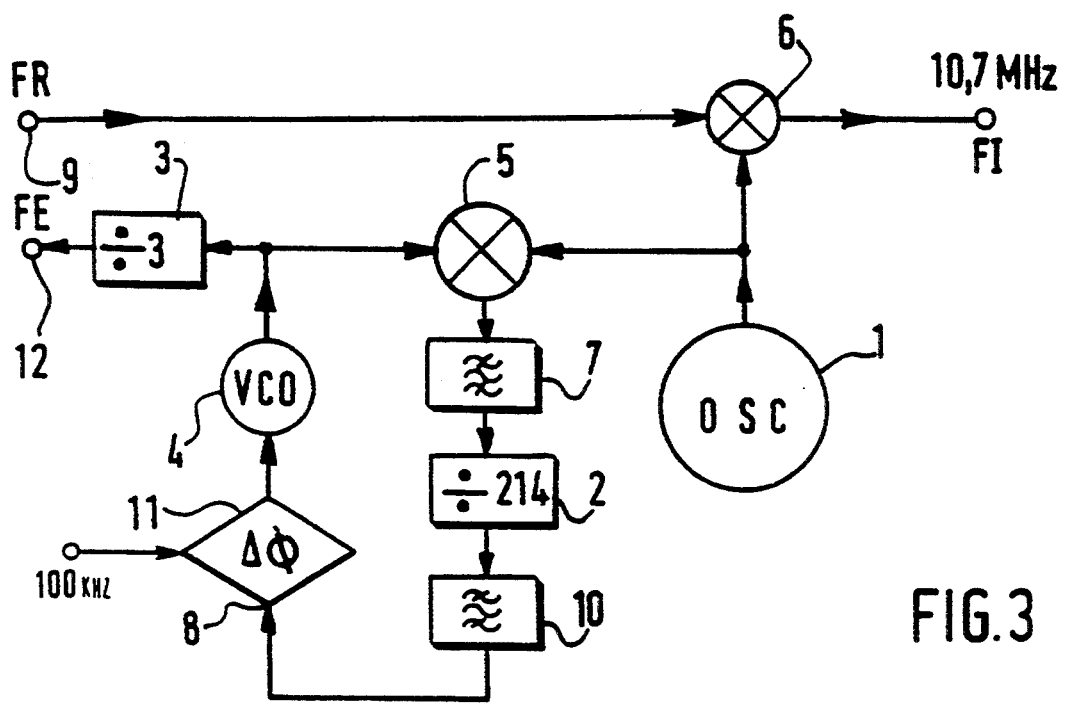
FIG. 3 is a diagram of a frequency generator to be used in a modulator-demodulator arrangement.

A generator which is capable of supplying the required frequencies is shown in FIG. 3. It comprises a first oscillator 1. The value of the frequency of this oscillator is equal to the sum of the value FR of the reception frequency and of the value FI of the frequency desired as an intermediate frequency. The generator comprises a second oscillator 4 whose frequency is controllable. The signals from the oscillators 1 and 4 are applied to two respective inputs of a mixer 5 and the mixed output signal whose frequency must be equal to twice the desired intermediate frequency (here 10.7 MHz) is applied via a bandpass filter 7 to a frequency divider 2 dividing its frequency by 214, which provides a signal whose frequency must thus be 100 kHz. This signal is applied via a bandpass filter 10 to the input 8 of a control circuit 11 which receives for comparison a reference signal having a frequency of 100 kHz. This control circuit 11 supplies (via a low-pass filter not shown) a control signal having the frequency of the second oscillator 4. The frequency of the oscillator 4 is thus controlled so as to be shifted by 21.4 MHz (i.e. twice the desired intermediate frequency) with respect to that of the oscillator 1. The signal of the second oscillator 4 is applied to a divider 3 which divides its frequency by three for supplying a signal at the transmission frequency to a terminal 12.

The reception signal at the terminal 9 is applied to a mixer 6 together with the signal of the first oscillator 1 for supplying the signal of the intermediate frequency of 10.7 MHz.

Each head-end modem 13 comprises a similar reciprocal structure.

Figure 4:
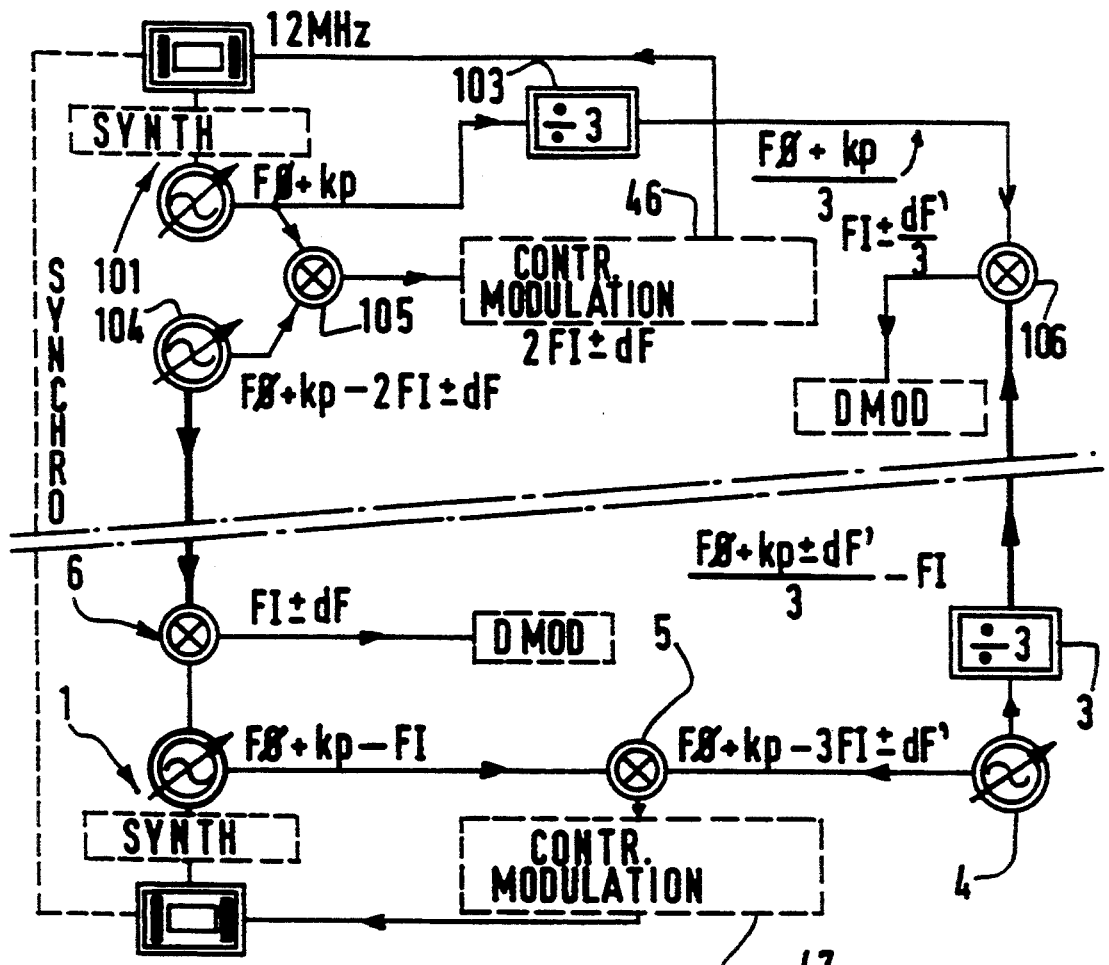
FIG. 4 is a frequency survey with reference to the principal elements of the system.

In FIG. 4 indicating the frequencies which are found in the whole system the principal elements 1, 3, 4, 5, 6 of the generator of FIG. 3 are shown again diagrammatically, as well as their equivalents in the head-end modems, which are denoted by the reference numerals 101,103, 104, 105, 106, respectively. Each pilot oscillator 1 or 101 is a quartz oscillator with a synthesizer SYNTH, which oscillator may have its frequency adjusted so as to correspond to a given sub-range. In the present example the frequency range of 12.9–19.5 MHz divided into one hundred sub-ranges of 66.66 kHz each are chosen for use at the transmitter end of each user modem 15. In each head-end modem 13, a frequency range of 200 kHz (the frequency range of 49.4–69.2 MHz divided into one hundred sub-ranges of 200 kHz each) is then used. The Figure indicates whether the signal has a modulation and how the frequency depends on the channel used (a "channel" is understood to mean the whole of the transmission equipment using a sub-range of given transmission frequencies and a sub-range of given reception frequencies). In FIG. 4 the reference "k" is the order or number of a channel and "p" is the width of a channel at the level of the pilot oscillator.

Figure 6:
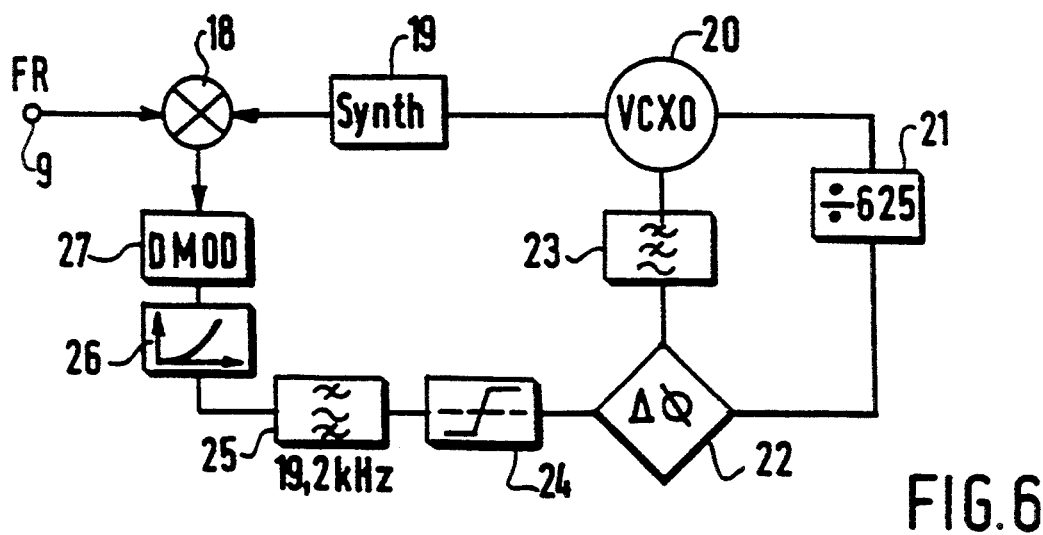
FIG. 6 is a diagram of a circuit for synchronizing the time bases between a head-end modulator-demodulator arrangement and a user modulator-demodulator arrangement.

Here "p" is equal to 200 kHz for all the channels and "k" may vary between 0 and 99. The frequency of the pilot oscillator of the head-end modem of the number 0 channel is denoted "FO", and "FO+kp" is thus the frequency of the head-end pilot oscillator for the channel "k". A modulation is shown by means of "+/df". Modulation control elements 46, 47 will hereinafter be described in greater detail with reference to FIG. 8. The demodulators "DMOD" which supply at the end of the count the data to the user or to the distributor may be conventional demodulators. The broken line denoted by "SYNCHRO" is not a physical line but symbolizes the synchronizing means of the oscillators which will hereinafter be described with reference to FIG. 6.

Figure 5:
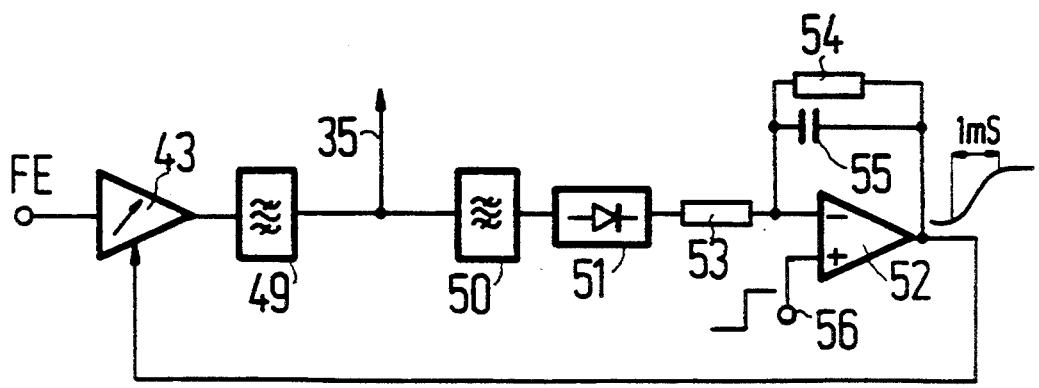
FIG. 5 is a diagram of a circuit for controlling the amplitude of the transmission carrier.

Within one and the same sub-group, the users are interrogated in turns in accordance with a process known as circular "polling". This process provides the possibility of suppressing the carder of user modems 15 which "do not have the word" at a given instant. This is realized, for example by inhibiting the divide by three circuit (reference numeral 3, FIG. 3). However, the suppression and periodical activation of the carrier introduces a very annoying switching noise in the channel. To avoid this, a special circuit for servo controlling the amplitude of the transmission carrier, which is shown in FIG. 5, is used. The modulated transmission signal at the terminal FE is used again in an amplifier 43 having an electrically controllable gain which is followed by a low-pass filter 49, before it is finally sent to the other modems via the connection 35. This final signal is filtered in a filter 50 whose object is to eliminate parasites from the connection 35 and is then rectified in a rectifier 51. An operational amplifier 52 has its gain fixed in known manner by means of two resistors 53, 54 whose central tap is connected to the input "−" of the operational amplifier. The rectified signal is applied to this amplifier via the resistor 53. A capacitor 55 slows down in known manner the transitions at the output of the amplifier 52, which output is connected to the control input for controlling the gain of the amplifier 43 for the transmission signal. A control voltage 56 for the carrier is applied to the input "+" of the operational amplifier 52. It is supposed that the gain of the amplifier 43 increases if the dc control voltage for controlling the gain increases. A value of the rectified voltage supplied by the rectifier 51 corresponds to a value of the voltage 56. It will easily be understood that the circuit functions as an amplitude control circuit and acts on the gain of the amplifier 43 for maintaining the amplitude at a nominal value. For a low value of the voltage 56 the gain of the amplifier 43 is low and the carrier on the connection 35 is attenuated. For a higher value of the voltage 56 the carrier is controlled at a nominal value. It is thus possible to supply at least two predetermined nominal values for said amplitude. The capacitor 55 which slows down the transitions at the output of the amplifier 52 constitutes a means ensuring that these values change from one to the other with a predetermined transition time.

With a modulation as defined above (MDF-2, factor 0.8) and a data rate of nineteen kilobits per second, a peak deviation of approximately fifteen kilohertz is obtained. If an ordinary quartz is used for the frequency synthesis, a temperature frequency drift of approximately one kilohertz may occur, which is not negligible before the modulation deviation and may give rise to nonlinear effects during demodulation and thus to a degradation of the binary error rate. To mitigate this, it is interesting to synchronize the time base of a head-end modem 13 and those of the corresponding user modems 15. In the diagram of the synchronization circuit shown in FIG. 6 a quartz oscillator 20 which is adjustable in frequency supplies a signal whose frequency is divided by six hundred and twenty-five in a divider 21. The descendant signal FR at the terminal 9 is demodulated in a frequency demodulator 27 after changing the frequency in a mixer 18 (since the descendant channel has a good signal-to-noise ratio, this demodulation is always possible), subsequently the demodulated signal passes through a nonlinear circuit 26, a bandpass filter 25 at 19.2 kHz and a limiter 24 and is finally applied to a phase comparator 22. The signal resulting from the comparison controls the frequency of the oscillator 20 after it has been filtered in a low-pass filter 23. This circuit functions in the following way: the head-end modem transmits, for example, between the protocol word frames, a series of identifiable data, for example 101010 ... etc, whose bit frequency is such that after demodulation in the demodulator 27 they generate a signal having a frequency of 19.2 kHz, which signal is compared in the comparator 22 with the local signal generated at the output of the divider 21. The frequency of the oscillator 20 is thus 19.2 kHz×625=12 MHz: this is the reference frequency for the synthesized oscillators 1 and 101 of FIG. 4 and, divided by 120, it also supplies the reference at 100 kHz received by the control circuit 11 of FIG. 3. The average centring error of the transmission channel of the respective user modem 15 is thus zero.

In the section of a user modem 15 intended for transmission, it is desired that the time constant of the phase-locked loop of the oscillator generating the transmission carrier is variable, as has been explained hereinbefore.

Figure 7:
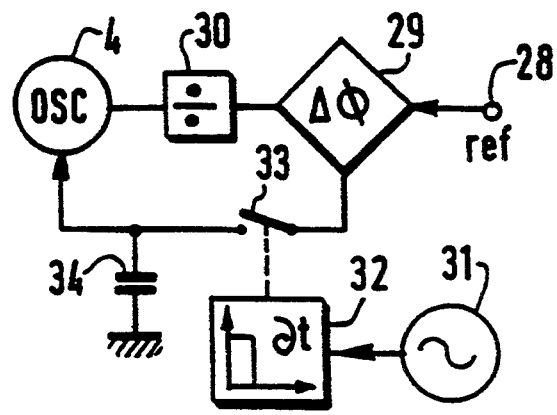
FIG. 7 is a diagram of a circuit for controlling the frequency, comprising a low-pass filter having an adjustable time constant.

To this end the circuitry of FIG. 7 is used. This is an embodiment of the circuit 11 of FIG. 3 and the oscillator 4 is common for the two Figures. This oscillator 4 supplies a signal which, after a change of frequency in an element 30 here symbolizing the elements 5, 7, 2, 10 of FIG. 3, is compared in frequency (and not in phase) in a comparator 29 with a frequency reference applied to the terminal 8 (reference at 2 FI=21.4 MHz obtained from the oscillator 20 of FIG. 6). The signal resulting from the comparison is stored in a capacitor 34 after it has passed in a switch 33 (of course an electronic switch is used). This circuitry constitutes a low-pass filter whose time constant depends on the opening rhythm of the switch 33. This switch is controlled by an auxiliary oscillator 31 of which each oscillation period triggers a pulse from a monostable circuit 32. The auxiliary oscillator 31 has nothing to do with the signal oscillators described so far: this is an element whose frequency is controlled as a function of the number of the channel and is of the order of 50 Hz. By controlling this frequency the time constant of the control loop of the oscillator is variable as a function of the number of the channel.

Figure 8:
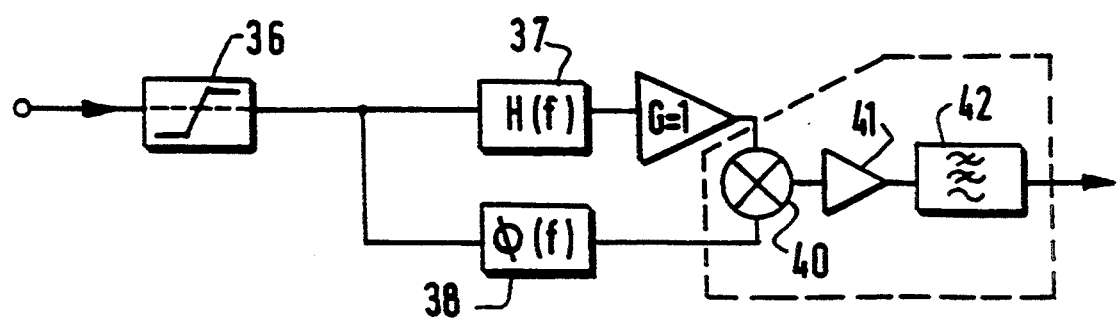
FIG. 8 is a diagram of a frequency demodulator.

As the oscillator comprises, for example in known manner a "varicap" diode on whose voltage the control loop acts to bring the frequency to the correct average value, it is easy to use the above-mentioned modulation, for example by means of a second "varicap" diode. The modulation ram, hence the modulation factor FSK which is an essential criterion, is then a function of the ratio between the capacitance values of the two "varicap" diodes and it is thus dependent on the used central frequency. To mitigate this drawback the intermediate frequency from the divider 2 of FIG. 3 and the modulation carrier of the oscillator 4 are locally demodulated so as to know the modulation rate and to be able to control it. The demodulator used for this purpose is shown in FIG. 8. It comprises a limiter 36 at whose output the path of the signal is divided into two branches: one of these branches comprises a bandpass filter 37 centred at the nominal central value of the intermediate frequency FI and the second branch comprises a phase-shifting network 38 adapted to introduce a phase shift which is equal to that produced by the filter 37 in the first branch so that a signal is produced which is in phase with the output signal of the filter in the frequency range. The signals coming from the two branches are multiplied in a multiplier 40 and the resultant signal which is amplified in an amplifier 41 finally passes through a low-pass filter 42. The limiter 36 consists of, for example, a simple MOS gate and the filter 37 is a commercially available ceramic filter. The mixer 40 and the amplifier 41 may in practice consist of a single transistor having a common emitter used simultaneously in the function of mixer and amplifier and the filter 42 is realized by means of a simple capacitor. Such a demodulator is similar to known demodulators but nevertheless it is original because the amplitude response variation of the filter 37 is used for producing the demodulation rather than the phase shift, as is common practice. The temperature stability and the reproducibility are the same as those of the ceramic filter, thus they are generally very good. Those skilled in the art can easily connect these means (for measuring the modulation factor) to a known element for controlling the modulation factor so as to adjust the mean value of this factor and thus constitute the modulation control devices which are shown in FIG. 4 by means of the reference numeral 46 (in the head-end modem) and 47 (in the user modem).

I claim:

1. A modulator-demodulator arrangement for an interactive communications network which receives at a first frequency and transmits at a second frequency, said modulator-demodulator arrangement being coupled to a transmitter-receiver comprising a heterodyne reception section using an intermediate frequency, wherein the value of said second frequency is equal to $(FR-FI*I_1)/I_2$, where FR is the value of said first frequency, FI is the value of said intermediate frequency, $I_1$ is a first integer and $I_2$ is a second integer.

2. The modulator-demodulator arrangement as claimed in claim 1, wherein the value of said first frequency is at least 47 MHz and at most 87 MHz and the value of said second frequency is at least 10 MHz and at most 30 MHz, and wherein said modulator-demodulator arrangement uses an intermediate frequency with a value of 10.7 MHz, and wherein said first integer is equal to one and said second integer is equal to three.

3. The modulator-demodulator arrangement as claimed in claim 1, further comprising:
   a) a first oscillator whose frequency is equal to the difference in value between the first frequency and the value of said intermediate frequency;
   b) a second oscillator whose frequency is controllable as a function of the difference between an input frequency and a reference frequency.

4. The modulator-demodulator arrangement as claimed in claim 3, further comprising means for aligning the frequency of said first oscillator with the binary rate of data from a second modulator-demodulator.

5. The modulator-demodulator arrangement as claimed in claim 1 which is interrogated by way of a selective call from a head-end modem, and which further comprises a circuit for controlling the amplitude of a carrier having said first frequency, said circuit comprising means for supplying at least two predetermined nominal values for said amplitude and means for ensuring that these nominal values change with a predetermined transition time.

6. The modulator-demodulator arrangement as claimed in claim 1, further comprising means for decoding information about a frequency to be used to receive a signal from a head-end modem, and means for adjusting the value of said first frequency as a function of said information.

7. The modulator-demodulator arrangement as claimed in claim 3, wherein a modulating signal is applied to said second oscillator so as to generate a carrier at said second frequency, and wherein said second oscillator is provided with a frequency control circuit which comprises a low-pass filter having and adjustable time constant.

8. The modulator-demodulator arrangement as claimed in claim 7, further comprising a frequency demodulator for demodulating said intermediate frequency.

9. The modulator-demodulator arrangement as claimed in claim 8, wherein said frequency demodulator has two branches, a first branch comprising a bandpass filter centered at said intermediate frequency and producing a first phase shift, and a second branch comprising a phase-shifting network adapted to introduce a second phase shift which is equal to said first phase shift.

* * * * *